United States Patent [19]

Schmitt

[11] 3,902,594

[45] Sept. 2, 1975

[54] APPARATUS FOR ARRANGING AND STACKING CONTAINERS

[75] Inventor: Robert A. Schmitt, Vancouver, Wash.

[73] Assignee: Columbia Machine, Inc., Vancouver, Wash.

[22] Filed: Sept. 27, 1973

[21] Appl. No.: 401,341

[52] U.S. Cl............ 198/244; 198/31 AB; 198/179; 198/283; 214/1 BA; 214/1 BB; 294/115; 294/116

[51] Int. Cl.² ........................................ B65G 47/24

[58] Field of Search ......... 198/33 R, 33 AB, 20, 22, 198/31 R, 31 AB, 179, 244, 257, 261, 283; 214/1 BB, 1 BA, 309; 294/116, 115, 113, 110, 106; 53/247, 245, 244

[56] References Cited
UNITED STATES PATENTS

| | | | |
|---|---|---|---|
| 2,293,553 | 8/1942 | Magnusson..................... | 198/33 AB |
| 2,524,880 | 10/1950 | Cattonar et al................ | 294/115 X |
| 2,863,579 | 12/1958 | Meyer.............................. | 214/1 BB X |
| 3,069,035 | 12/1962 | Schwarz et al................. | 214/309 |
| 3,136,105 | 6/1964 | Eckhoff......................... | 198/33 AB X |
| 3,209,512 | 10/1965 | Ferguson, Jr. et al........... | 53/247 X |
| 3,244,303 | 4/1966 | Conner.......................... | 214/1 BB X |
| 3,289,810 | 12/1966 | Iannucci....................... | 198/33 AB X |
| 3,442,410 | 5/1969 | Solomonson................... | 198/33 AB X |
| 3,462,912 | 8/1969 | Anderson...................... | 198/33 AB X |

Primary Examiner—Evon C. Blunk
Assistant Examiner—James L. Rowland
Attorney, Agent, or Firm—Kolisch, Hartwell, Dickinson & Stuart

[57] ABSTRACT

Apparatus for receiving randomly oriented containers, such as cans having bails connected thereto by projecting bail-attaching ears, and arranging them in rows with preselected orientations in the rows. The apparatus includes an infeed conveyor on which the cans are carried in succession into the apparatus, and a can turner which is operable to lift each can from the conveyor and turn the same about an upright axis until it is oriented as desired. The can then is carried by the conveyor to a receiving and holding region. Successive cans are turned to desired orientations and collected in a row in the receiving region. A horizontally shiftable frame above the receiving region has power-operated gripping tongs mounted thereon which are in registry with the cans when the same are collected in a row in the receiving region. The tongs are mounted on the frame for lowering to grip onto the cans in the row, and then may be raised to lift the row of cans from the conveyor. With the cans gripped and raised the frame is moved to a position over a support spaced from the receiving region, the tongs are lowered, and the cans are released therefrom to deposit them on the support.

5 Claims, 13 Drawing Figures

APPARATUS FOR ARRANGING AND STACKING CONTAINERS

BACKGROUND AND SUMMARY OF THE INVENTION

This invention relates to apparatus for receiving randomly oriented containers, such as cans, and arranging them in rows with the containers having preselected orientations within the rows.

In the automatic handling of containers, such as cans having bails, or wire handles, connected thereto by bail-attaching cars projecting from opposite sides of the can, it is often desirable to be able to receive randomly oriented cans and arrange them in rows with their bails, or bail-attaching ears disposed in preselected orientation relative to the rows. This is particularly important when arranging the cans for transport or packaging. Explaining further, when arranging rows of such cans, they can be positioned closer together and thus form a more compact and stable load, if the cans are oriented with their bail-attaching ears disposed at substantial angles relative to the line of a row. If the cans are oriented in the rows with their bail-attaching ears at substantial angles to the lines of the rows, the bail-attaching ears and handles on the bails will be disposed in the open regions between the cylindrical cans.

A general object of the present invention is to provide novel apparatus which is operable to receive randomly oriented containers, such as cans, in succession, turn them to a preselected orientation, and then deposit them in rows on a support in the orientation as established by such turning.

More specifically, an object is to provide novel apparatus which is operable to receive randomly oriented cans having bails connected thereto by bail-attaching ears which project from opposite sides of the can, turn such cans to positions in which their bails will be oriented at a substantial angle relative to rows into which they will be placed, and then transferring such cans into rows on a support with the cans having the orientation established in the turning process.

Yet another object is to provide such novel apparatus which includes power-operated gripping tongs operable frictionally to engage side margins of a container turned to a preselected orientation, lift it from an underlying support, or conveyor, and convey it onto a region over a support spaced therefrom and deposit it on said support, all the while maintaining the container in the orientation established in the turning process.

More specifically, an object of the invention is to provide such novel apparatus which includes a frame shiftable horizontally from a first position adjacent the can-turning means and a second position adjacent the support, a mounting for the tongs which permits horizontal movement of the tongs with the frame and vertical shifting of the tongs relative to the frame, and powered means for opening and closing the tongs independently of vertical movement of the tongs relative to the frame. With such construction, the tongs may be lowered into position adjacent a container, closed to grip onto the container, and then may be lifted to lift the container from an underlying support. Thereafter, with the container lifted and held by the tongs it may be shifted by powered movement of the frame to a position over the support, the tongs lowered, and then opened to deposit the container on the support.

DRAWINGS

These and other objects and advantages will become more fully apparent as the following description is read in conjunction with the drawings, wherein.

DETAILED DESCRIPTION OF AN EMBODIMENT OF THE INVENTION

Figure 1:
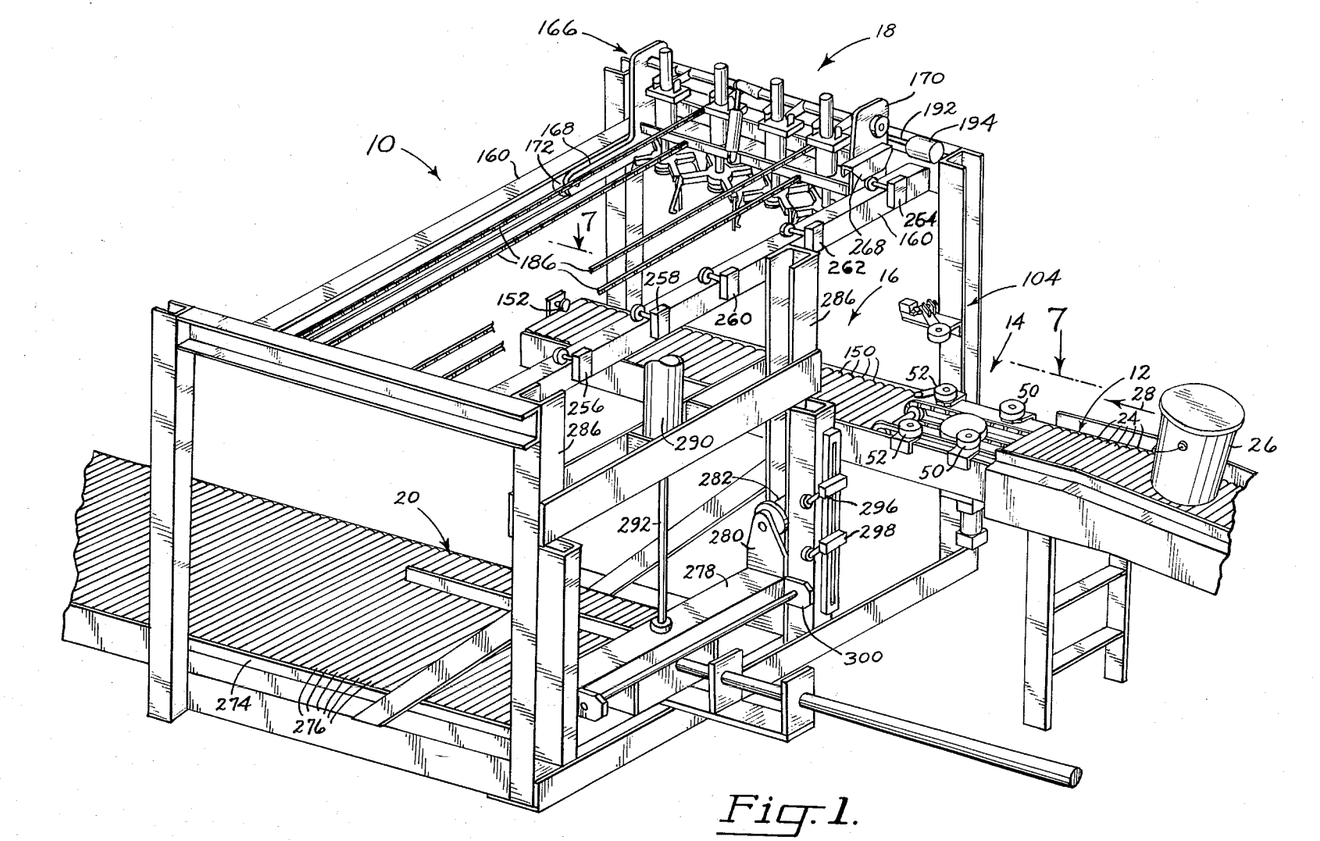
FIG. 1 is a perspective view of apparatus constructed according to an embodiment of the invention.

Referring now to the drawings and first more particularly to FIG. 1, at 10 is indicated generally apparatus constructed according to an embodiment of the invention. Describing the apparatus in general terms, it includes a first, or infeed, conveyor section 12, container-turning means 14, and a second conveyor at the downstream, or outfeed, side of turning means 14. Positioned above conveyor 16 is container transfer means 18. At 20 is indicated generally a vertically shiftable roller platform, or support, onto which containers may be transferred by transfer means 18.

Infeed conveyor 12 includes a plurality of elongate, parallel, power-driven rollers 24 which form a support over which a container, such as a can 26, may be conveyed along a path in the direction of arrow 28.

Figure 2:
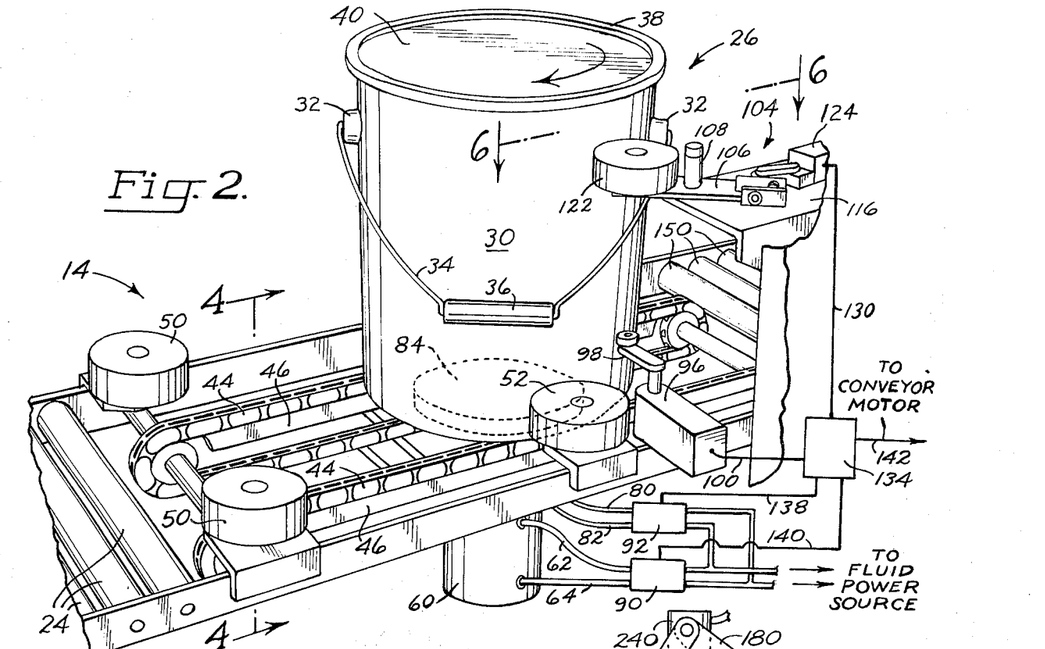
FIG. 2 is an enlarged perspective view of can conveying and turning means in the apparatus.

Referring to FIG. 2, where a can, or container, 26 is illustrated in greater detail, it will be seen that such can has a generally cylindrical body, or sides, 30 at opposite sides of which are secured outwardly projecting bail-attaching ears 32. A wire bail 34 is swingably connected at its opposite ends to bail-connecting ears 32. A tubular handle 36 is rotatably mounted on bail 34 intermediate its ends. The upper margin of can 26 has an outwardly projecting lip, or rim, 38 extending fully around the top of the can. A depression 40 is formed in the top of the can and has such size as to receive the base of a similarly sized can.

Figure 4:
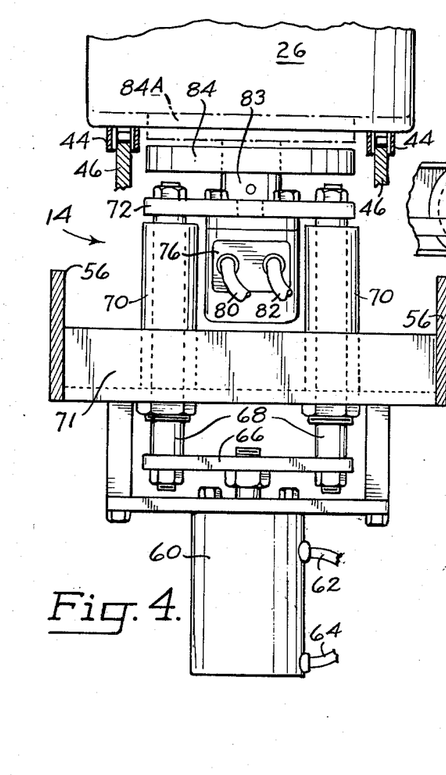
FIG. 4 is a side elevation view of the can-turning means taken generally along the line 4—4 in FIG. 2.

Referring to FIGS. 2 and 4, a pair of laterally spaced, endless, elongated power-driven chains 44 form an extension of conveyor 12. The upper, substantially horizontal, reaches of chains 44 are supported on bars 46 and are adapted to support the base of a can for movement along the previously mentioned path in the apparatus.

A first pair of rollers 50 and a second pair of rollers 52 are spaced on opposite sides of chains 44 and have such spacing as to maintain a can 26 substantially centrally located on chains 44 as it is moved therealong.

Referring still to FIGS. 2 and 4, turning means 14 supported intermediate chains 44 will be described in greater detail. In FIG. 4, a pair of side bars 56, illustrated in cross section only, are secured at a preselected elevation in the apparatus. Supported in depending relation from side bars 56 is an upright fluid-operated ram 60. A pair of fluid supply and exhaust conduits 62, 64 are connected to the upper and lower ends of the ram, respectively. The rod end of the ram is secured through a cross plate 66 to at least a pair of laterally spaced upright rods 68. Rods 68 extend upwardly from plate 66, slidably through sleeve guides 70 secured through a cross bar 71 to side bars 56. Secured to the upper ends of rods 68 is a cross plate 72.

Supported on cross plate 72 is a hydraulic motor 76 to which are connected fluid supply and exhaust lines 80, 82. Motor 76 is so constructed that supply of fluid under pressure to one of the lines results in rotation of the upwardly projecting shaft 83 of the motor and turntable 84 secured thereto about the vertical axis of shaft 83.

Extension of ram 60 is operable to raise rod 68, cross plate 72, motor 76 and turntable 84 connected thereto from the lowered, inoperative, position illustrated in solid outline in FIG. 4 below the upper surfaces of chains 44 to a raised, or operative, position with turntable 84 in the position illustrated in dot-dash outline at 84A in FIG. 4 above the upper surfaces of chains 46. Introduction of fluid under pressure into one of lines 80, 82 and exhaust of fluid from the other serves to rotate turntable 84 under power.

Referring to the schematic diagram of the hydraulic system for the turning means illustrated in FIG. 2, lines 62, 64, and lines 80, 82 are connected through solenoid-controlled valves 90, 92, respectively, to a source of pressure fluid. Each of valves 90, 92 is shiftable between a nonactuated, or closed, position, and an actuated, or open, position dependent upon whether an electrical signal is received by the valve. Normally, in their non-actuated states, valves 90, 92 are so positioned as to place ram 60 in a retracted state, with turntable 84 lowered and motor 76 not operating. Upon actuation valve 90 opens to admit fluid under pressure through line 64 to extend ram 60 and raise turntable 84 and actuation of valve 92 provides fluid under pressure to one of lines 82 to actuate motor 76 and turn turntable 84 under power.

Referring still to FIG. 2, adjacent one of rollers 52, and at the downstream side thereof, is secured a limit switch 96 having a switch arm 98. A can moved in a downstream direction along the path in the apparatus on chains 44 engages switch arm 98, and on moving of the arm, a signal is produced at output line 100 connected to the switch.

Figure 6:
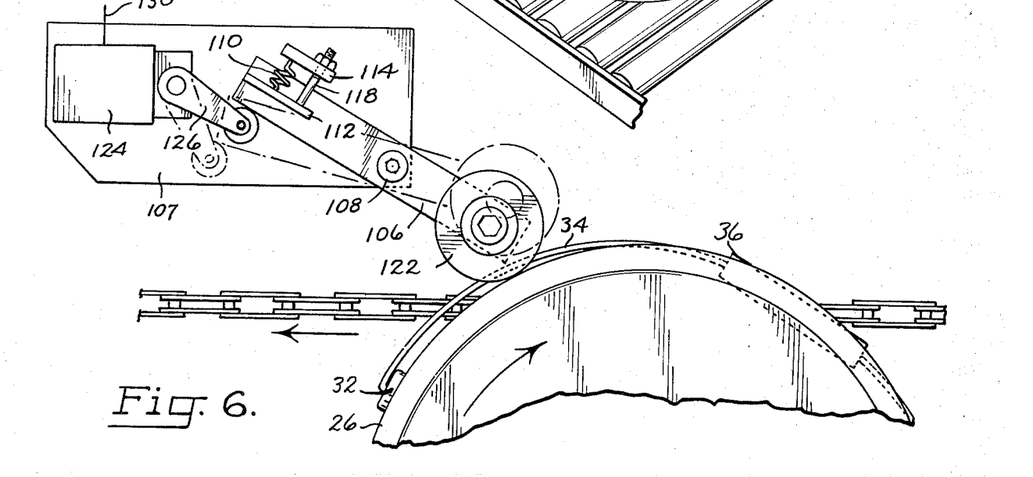
FIG. 6 is an enlarged top plan view, taken generally along the line 6—6 in FIG. 2, of a swing arm and switch for sensing the position of a can turned by the turning means.

Mounted above switch 96 is turntable control means indicated generally at 104. Referring to FIGS. 2 and 6, the control means includes an elongate arm 106 mounted on a plate 107 for swinging movement about a vertical pivot axis provided by pivot connection 108. A tension spring 110 is connected at one of its ends to an upright plate 112 on one end of arm 106. The other end of spring 110 is connected to a plate 114 secured to plate 107 and yieldably biases the arm to swing in a clockwise direction as viewed in FIG. 6. An adjustable threaded stop 118 limits movement of the arm in such clockwise direction.

A resilient roller 122 is journaled for rotation about an upright axis at the opposite end of arm 106. The roller 122 is at such an elevation in the apparatus that it is on the same horizontal plane with bail-attaching ears 32 on a can when the can is lifted from chains 44 by operation of the turning means.

Also mounted on mounting plate 107 is a limit switch 124 having a switch arm 126. Switch arm 126 is so positioned that upon swinging of arm 106 in a counterclockwise direction as viewed in FIG. 6 it eventually comes into contact with switch arm 126 and operates to close switch 124. The output side of switch 124 is connected through a line 130 to an electrical control circuit 134 (see FIG. 2). Line 100 from the output side of switch 96 also is connected to an input terminal of circuit 134. Output terminals of circuit 134 are connected through lines 138, 140 to solenoid controlled valves 92, 90, respectively. Another line 142 connected to an output terminal of circuit 134 is connected to a control circuit for the motor which actuates conveyor 12 and chains 44.

Circuit 134 may be of conventional construction and is operable to control actuation of the infeed conveyor and turning means by producing the following functions. When a can 26 carried by chains 44 toward turntable 84 engages switch arm 98 it produces a signal at line 100 at the output side of switch 96. When this signal is received by circuit 134 it produces a signal at the output terminal to which line 142 is connected to stop conveyor 12 and chains 44, thus to stop the can above turntable 84. A signal also is produced at the output terminal to which line 140 is connected to actuate solenoid controlled valve 90 to extend ram 60, raise turntable 84, and lift can 26 from chains 44. A timing circuit within circuit 134 delays a signal being produced at the output terminal to which line 138 is connected until ram 60 has sufficient time to raise turntable 84 to its operative position. After such time delay a signal is produced by circuit 134 which actuates valve 92 to produce rotation of motor 76 and turntable 84 to rotate can 26 in the direction of the arrow illustrated in FIGS. 2 and 6.

As can 26 is rotated a bail-attaching ear 32 will come into contact with roller 122 and swing arm 106 in a counterclockwise direction as seen in FIG. 6. This causes plate 112 to contact switch arm 126 and produces a signal at line 130. This signal transmitted by line 130 to circuit 134 causes the signal at line 138 to cease, thus returning valve 92 to its nonoperative position and stopping rotation of the turntable and can. The signal at line 140 also ceases, deactivating valve 90 and producing retraction of ram 60 causing turntable 84 to lower and can 26 to be replaced on chains 44. After a preselected time interval which is sufficient to permit stopping of the turntable and lowering of the can onto the chains, a signal is again produced at line 142 to initiate actuation of the motors for conveyors 12 and chains 44 to continue movement of the can along the path toward conveyor 16.

It will be noted that the positioning of arm 106 is such that when a bail-attaching ear 32 engages and swings arm 106 a line extending from the center of the can through the bail-engaging ear is disposed at substantially a 45° angle from the line of the path along which the can is carried by the conveyors. This, then, is the selected orientation in this emodiment of the invention to which all cans conveyed to the turntable are to be rotated and set, i.e., with their bail-engaging ears disposed along lines at 45° to the path of the conveyor.

Figures 7, 8, 9, 10, 11, 12, 13:
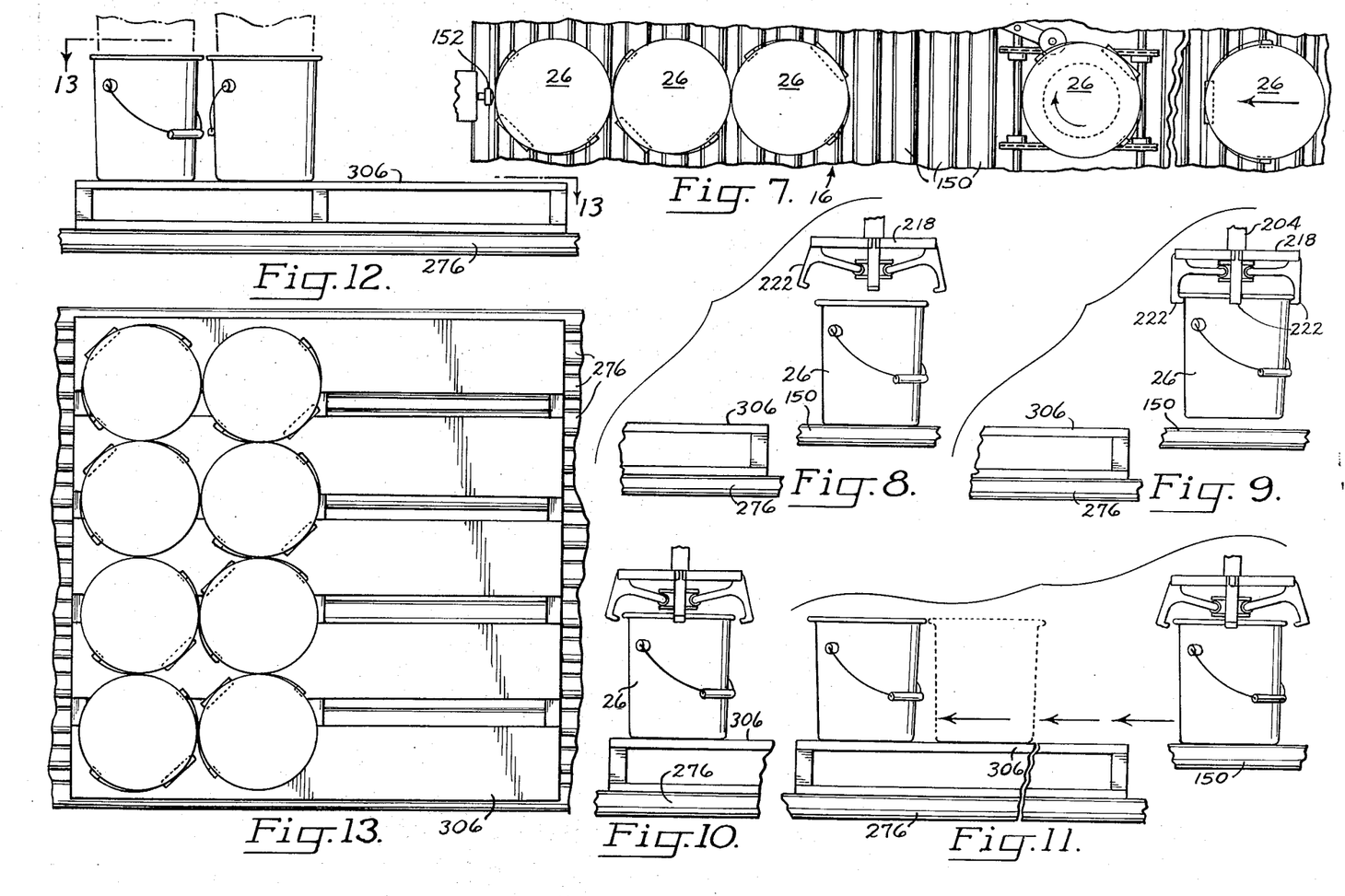
FIG. 7 is a top plan view, taken generally along the line 7—7 in FIG. 1, of a portion of the apparatus during operation.
FIGS. 8–11 are partial views of the apparatus during a sequence of operation of the transfer means.
FIG. 12 is a side elevation view of a pallet onto which two rows of cans have been placed by the apparatus.
FIG. 13 is a top plan view taken generally along the line 13—13 in FIG. 12.

Conveyor 16 on the downstream side of turning means 14 includes a plurality of elongated, parallel rollers 150 over which cans passed from the turning means are carried. As seen in FIGS. 1 and 7, a bumper 152 is secured adjacent the downstream end of conveyor 16 against which the first can in a series conveyed therealong is stopped. Successive cans as seen in FIG. 7 will be stopped by cans preceding it on conveyor 16 to form a row of contiguous cans on rollers 150. This may be referred to as a can receiving and holding region in the apparatus.

The main frame of apparatus 10, as seen in FIG. 1, comprises a pair of laterally spaced, parallel, elongated, horizontal tracks, or channels, 160 which are spaced a distance above rollers 150 and extend laterally thereof to a position spaced above platform 20.

Transfer means 18 includes an elongated transfer frame 166 having upright side plates 168, 170 adjacent its opposite ends which are mounted, as through rollers 172, for movement along tracks 160. Extending between, and secured at its opposite ends to side plates 168, 170 is an elongated channel 174 (see FIGS. 3 and 5). Extending parallel to channel 174 and fully between side plates 168, 170 is a shaft 178 which is journaled at its opposite ends on n side plates 168, 170 for rotation relative thereto about its central axis. Secured to an extending outwardly from the midportion of shaft 178 is an arm 180. An extensible-contractible, fluid-actuated ram 182 is connected at one of its ends to channel 174 and at its other end of the outer end of arm 180. Extension of ram 182 rotates shaft 178 in a clockwise direction as seen in FIG. 5, and retraction of the ram rotates it is an counterclockwise direction.

Figure 5:
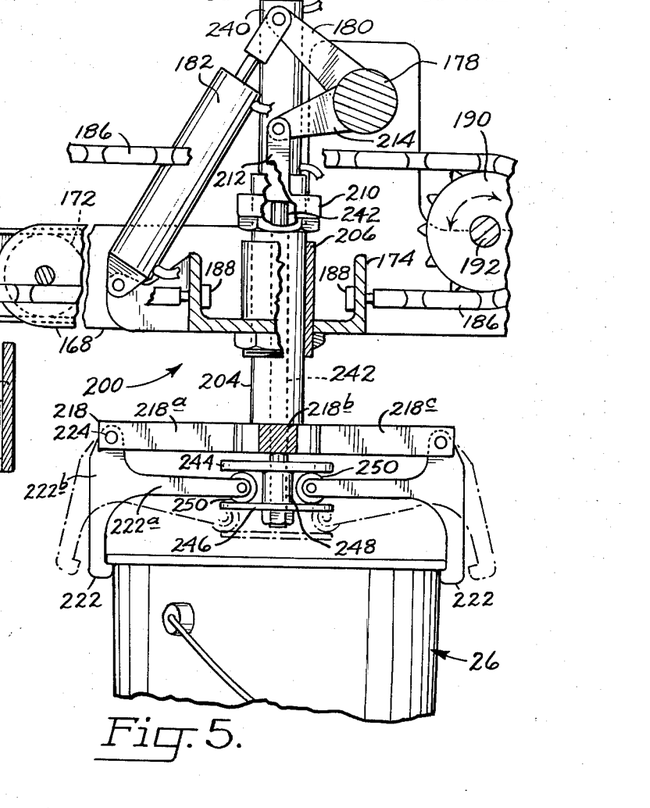
FIG. 5 is an enlarged cross-sectional view of the can transfer means taken generally along the line 5—5 in FIG. 3.

Movement of frame 166 along track 160 is produced by a pair of laterally spaced, elongated drive chains 186, each of which is connected at its opposite ends to opposite side of channel 174, as through fastening devices 188 illustrated in FIG. 5. Chains 186 have upper and lower reaches extending between the frame members of the apparatus supporting tracks 160. At each end of track 160 the chains are trained in reverse bends about sprockets supported on the fame members, such as sprocket 190 illustrated in FIG. 5. Sprockets 190 at one end of the frame are connected through a common shaft 192 to a reversible motor 194. Operation of motor 194 in one direction serves to drive frame 166 in one direction along the track from a first position as shown in FIG. 1 overlying rollers 150 of conveyor 16 to a second position spaced toward the viewer in FIG. 1 along the tracks over support platform 20. Operation of the motor in a reverse direction returns the frame from its second to its first positions.

Supported on frame 166 are a plurality of can gripping and lifiting devices indicated generally at 200. Each of the four gripping and lifting devices illustrated are similar, and thus only one will be described in detail.

Figure 3:
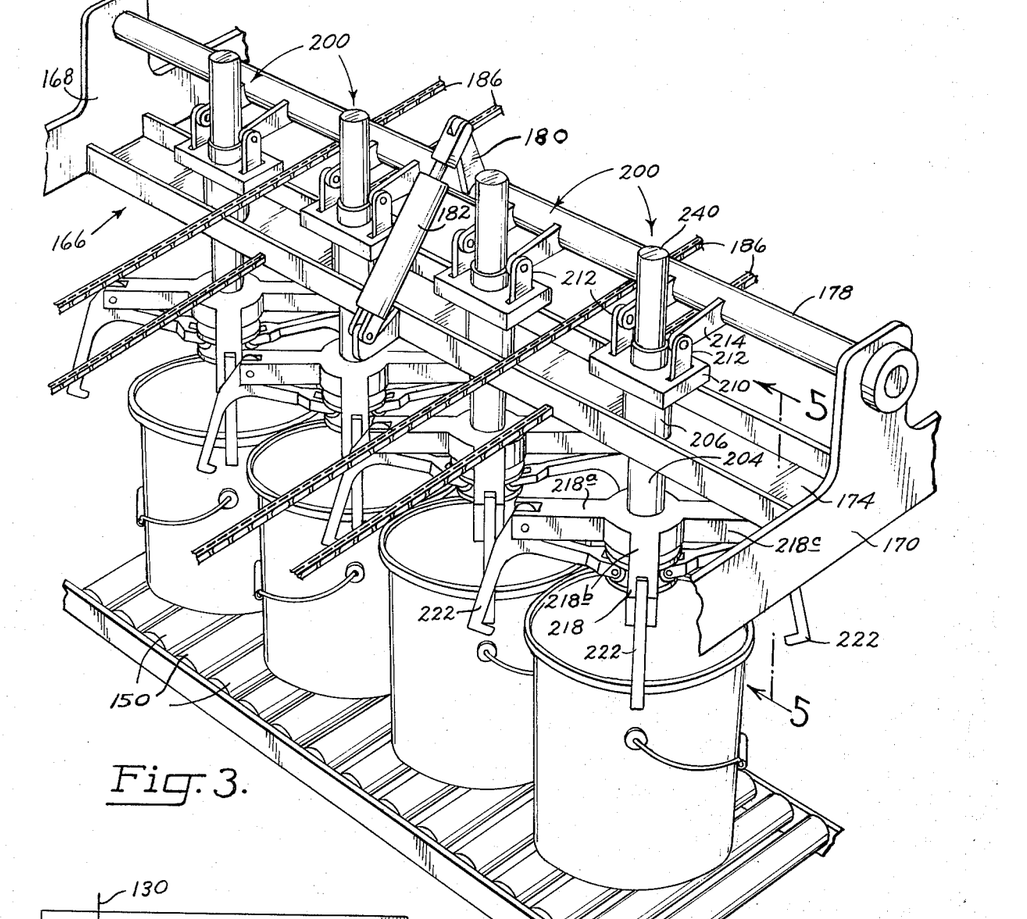
FIG. 3 is an enlarged perspective view of can shifting, or transfer, means in the apparatus.

Referring to FIGS. 3 and 5, a device 200 includes an upright tubular column 204 which extends vertically and slidably through an upright sleeve 206 secured to and extending through channel 174. A cross plate 210 is secured adjacent the top of column 204. A pair of laterally spaced upstanding connecting lugs 212 are secured to and project upwardly from plate 210. A pair of laterally spaced arms 214 secured to and projecting outwardly from shaft 178 are pivotally connected at their outer set of ends to lugs 212. With such connection to shaft 178, rotation of shaft 178 caused by extension and retraction of ram 182 serves to raise and lower column 204.

Secured to the lower end of column 204 is a horizontally disposed X-shaped support, mounting member, 218. Member 218 has four elongated support arm portions, three of which are illustrated in FIG. 3 at 218a, 218b, 218c, which radiate outwardly from a central region of the member and are disposed isposed at 90° to each other.

A plurality of substantially T-shaped gripping members 222 are pivotally connected to and dependently supported on support member 218. As is best illustrated in FIG. 5, each gripping member 222 has a substantially horizontal, central, or operating arm 222a and a vertically disposed crossbar or arm 222b. Arm 222b is pivotally connected at its upper end at 224 to an outer end of its associated support arm on the support member. The gripping members are mounted for swinging movement about substantially horizontal axes between what may be considered gripping positions illustrated in solid outline in FIG. 5 in which projections on the lower ends of arms 222b are in positions to engage side margins of the upper edge of a can 26, and a release position shown in dot-dash outline in FIG. 5 spaced outwardly therefrom.

A fluid power-operated extensible-contractible ram 240 is secured in an upright position to the top of column 204 for vertical movement with column 204. The elongate, vertically disposed, extensible-contractible shaft, or rod, 242 of ram 240 extends slidably through a central bore in tubular column 204. Secured to the lower end of rod 242 is an operating head including a pair of vertically spaced, horizontally disposed disks, or plates, 244, 246 which are held in a preselected vertically spaced relation by a spacer 248 interposed therebetween.

The inner ends of operating arms 222a of gripping members 222 are received between plates 244, 246 and have rollers 250 journaled thereon adapted for rolling movement between plates 244, 246.

With ram 240 contracted, shaft 242, plates 244, 246 and arms 222 are in what may be considered a gripping, or closed, position as shown in solid outline in FIG. 5. On extension of ram 240, shaft 242, plates 244, 246, and the inner ends of arms 222a of the gripping members are lowered to the position shown in dot-dash outline in FIG. 5, with the depending portions of members 222b swinging outwardly to their release positions shown in dot-dash outline in FIG. 5.

Positioned at spaced intervals along one of tracks 160 at the top of the apparatus, as seen in FIG. 1, are limit switches 256, 258, 260, 262, 264. Each of these switches has a control arm which is in a position to be engaged and depressed by an actuating cam 268 secured to side plate 170 of the transfer frame. The spacing between the switches corresponds to the general placement of rows of cans to be deposited on support platform 20, as will be more fully described below. The switches are connected, through control circuitry (not shown) to motor 194 in such a manner as to control movement of the transfer frame along the tracks.

Referring to FIG. 1, support platform 20 includes a frame 274 on which are supported a plurality of parallel, substantially horizontal, elongate rollers 276.

The rear end of frame 274 (nearest the viewer in FIG. 1) includes a cross member 278 at opposite ends of which are secured side plates, such as that indicated generally at 280, carrying rollers such as roller 282. Rollers 282 are received in upright channels, or tracks, 286 which function to guide frame 278 for vertical movement in the apparatus. An upright elongate cylinder 290 having a vertically reciprocable rod 292 connected to cross member 278 of the frame is operable to raise and lower the support platform as desired. As is seen in FIG. 1 also, a plurality of vertically spaced switches, such as those illustrated at 296, 298 are positioned adjacent one of tracks 286 for engagement by a member 300 projecting outwardly from cross member 278 on raising and lowering of the support platform. Such switches are positioned at intervals corresponding to the height of cans to be operated upon by the apparatus and are connected through conventional control circuitry for controlling operation of cylinder 290 for raising and lowering the support platform, as will be more fully described below.

Describing the operation of the apparatus, individual cans 26 are conveyed in succession and in random orientation by conveyor 12 to turning means 14. At the turning means they are lifted from the conveyor and turned to a desired orientation, as has been described above, with the bail-attaching ears on the cans oriented at substantially a 45° angle from the direction of the path of movement for the cans. After each successive can 26 has been so oriented by the turning means, it is carried onto rollers 150 of conveyor 16 until a row of such cans if formed as illustrated in FIGS. 3 and 7.

With transfer frame 160 in what has been termed its first position, over conveyor 16, each of gripping devices 200 is disposed over and is in registry with one of the cans in the row. Further, each of the cans in the row is disposed with its bail-engaging ears disposed at approximately a 45° from the line of the cans, as is seen in FIG. 7.

When a row of cans thus has been received on conveyor 16, ram 182 on the transfer frame is contracted to rotate shaft 178. This lowers supports 218 and gripping members 222 toward the cans. Rams 240 of devices 200 previously have been extended to hold gripping members 222 in their release positions, swung outwardly and away from each other as illustrated in FIGS. 3 and in dot-dash outline in FIG. 5. Thus, as the supports and gripping members are lowered the lower arm portions of gripping members 222 are disposed outwardly from and adjacent side margins of the top of a can 26. When the gripping members have been lowered to the position shown in dot-dash outline in FIG. 5, ram 240 is contracted. This raises plates 244, 246 and the inner ends of arms bearing rollers 250, thus to swing the arms inwardly and against opposing sides of the upper marginal edge of the can 26 as illustrated in solid outline in FIG. 5.

Extension of ram 182 rotates shaft 178 in a clockwise direction as seen in FIG. 5 to produce lifting of columns 204 and support members 218 and gripping members 222 secured thereto. This results in lifting of can 26 from rollers 150 as illustrated in FIG. 9. With the row of cans thus lifted from rollers 150 by gripping devices 200 they are in a position to be shifted outwardly and over support platform 20. Previously, a pallet such as that indicated generally at 306, has been placed on rollers 276 of support platform 20 and the support platform has been raised to a position in which the top of pallet 306 is at substantially the same elevation as the top of rollers 150 of conveyor 16. This is best seen in FIGS. 8, 9 and 11.

Motor 194 (FIG. 1) then is actuated to move transfer frame 166 along tracks 160 toward the viewer in FIG. 1 to place the transfer frame over pallet 306. Control mechanism in the apparatus is so constructed that the first row of cans raised from rollers 150 and transferred over pallet 306 is carried fully along rails 160 until cam 268 engages the arm of switch 256 (see FIG. 1). The transfer frame motor 194 then is stopped with the cans held by the gripping devices supported over a portion of pallet 306 adjacent its marginal edge farthest from conveyor 16.

As illustrated in FIG. 10, with the transfer frame and cans so positioned ram 182 on the transfer frame is contracted to lower the gripping devices and cans until the bottoms of the cans come to rest on pallet 306. Extension of rams 240 of the gripping devices then spreads the gripping members to release their hold on the cans and ram 182 is extended to raise the devices above the tops of the cans which then rest on the pallet.

With the gripping devices raised above the tops of the cans, the transfer frame motor 194 is operated in reverse to return the transfer frame to its position over conveyor 16 to pick up another row of cans as indicated in FIG. 11. It thereafter lifts this next row of cans from rollers 150, and shifts it toward the previously deposited row of cans on pallet 306. The control mechanism to which switches 256, 258, etc., are connected is constructed to stop the transfer frame on engagement of the arm of switch 258 by cam 268 thus to stop the transfer frame with cans 26 in this second row closely adjacent the previously deposited row. This second row then is lowered onto the pallet and released by the gripping members. Subsequent rows of cans carried from conveyor 16 to pallet 306 are stopped by successive actuation of switches 260, 262 to deposit a plurality of contiguous rows of cans on the pallet.

As is seen in FIG. 13, the cans thus deposited on the pallet are in straight rows with four cans in each row. The bail attaching ears and the handles on the bails are all disposed substantially at 45° to the line of the rows. This assures that the bail-engaging ears and the handles are in the open spaces between the cans, thus to permit close, snug engagement of cans in the rows.

After a number of rows of cans have been deposited on the pallet, to provide a first layer of cans on the pallet, ram 290 supporting platform 20 is extended to lower the platform the distance of the height of a can. Thereafter, transfer means 18 may be operated to place another layer of cans on top of those previously placed on the pallet, with the second layer of cans resting on and in the depressions in the tops of the first layer of cans, as illustrated by the base of the second layer of cans in dot-dash outline in FIG. 12.

Thus, apparatus is provided which is operable to receive randomly oriented cans having bail-attaching ears thereon which project out from the cans, turn the cans to a preselected orientation, and transfer the cans into rows on a support with the cans in the rows being oriented with their bail-attaching ears disposed at substantial angles relative to the lines of the rows. In this manner, cans may be closely stacked on the pallet to provide a compact stable load.

While a preferred embodiment of the invention has been described herein, it should be apparent to those skilled in the art that variations and modifications are possible without departing from the spirit of the invention.

It is claimed and desired to secure by Letters Patent:

1. Apparatus for placing in aligned rows cans having bails attached thereto by ears projecting from opposite sides of the can, said apparatus being operable to receive cans with the ears in random positions and to position the cans in rows with the ears in preselected orientations relative to said rows, said apparatus comprising an infeed conveyor for moving randomly oriented containers in succession along a path in the apparatus, powered turning means in said path operable to engage a container and rotate the same about an upright axis, control means operable to sense the position of a container rotated by said turning means and to stop turning of the container when the bail-attaching ears thereon are disposed at a preselected angle relative to the path in the apparatus, conveyor means operable to carry cans along such path away from said turning means in the orientation established by said turning means to a can-receiving and holding region with such cans forming into a row in said region, a container support spaced from said receiving and holding region, and shifting means for moving a row of cans thus received in said region and depositing them on said support, all the while maintaining the orientation of the cans as established by said turning means, said shifting means including a horizontally shiftable frame movable under power between a first position adjacent said receiving and holding region and a second position adjacent said support, a plurality of horizontally spaced groups of gripping tongs mounted on said frame in such positions that each group of tongs is in registry with a can received in said receiving and holding region when said frame is in its first position, each of said groups comprising at least three opposed tongs mounted on a common mounting member connected to said frame for movement horizontally with said frame and for movement vertically relative to the frame, each tong in a group being pivotally depended from said mounting member in a region spaced radially outwardly from the center of said group of tongs and having an operating arm portion projecting toward said central region, powered operating means including an operating head operatively connected to the inwardly directed end portions of said arm portions shiftable vertically under power to produce opening and closing of said depending arm portions to grip and release cans therebetween, powered lifting means for raising and lowering said tongs between lowered positions disposed to grip side margins of said cans with the frame in its said first position and raised positions spaced thereabove, and drive means for shifting said frame and tongs mounted thereon between said first and second positions.

2. Apparatus for receiving randomly oriented containers and arranging them in rows on a support with the containers having preselected orientation in the rows, the apparatus comprising an infeed conveyor for moving randomly oriented containers in succession to a turning region in the apparatus, said infeed conveyor including a conveyor support having an upper surface on which the bottom of a container may rest, powered turning means at said turning region operable to engage a container and rotate the same toward a desired orientation, said turning means including a turning element mounted adjacent said conveyor support for rotation about an upright axis and for vertical shifting between a lowered position below the elevation of said surface and a raised position above said elevation for engaging the bottom of a container and raising it from the conveyor support for turning, powered raising means operatively connected to the turning element for producing said vertical shifting, and powered rotator means operatively connected to said turning element for rotating the same about said upright axis when the same is in its raised position, control means operable to sense the position of a container rotated by said rotator means and to stop the same when the container has reached said desired orientation, a container support spaced from said turning region, and shifting means for moving a container from said turning region and depositing it on the container support, all the while maintaining the orientation of the container as established by said turning and control means, said shifting means including a horizontally shiftable frame, at least a pair of horizontally spaced gripping members mounted for movement toward and away from each other, mounting means including a mounting member supported on said frame for vertical shifting relative thereto mounting said gripping members on said frame for movement horizontally therewith and for movement vertically relative to the frame, each of said gripping members including an elongate arm dependently supported on said mounting member and pivotally connected thereto for swinging about a substantially horizontal axis spaced horizontally outwardly to opposite sides of a central region of the mounting member and an operating arm portion projecting toward said central region, powered operating means connected to said gripping members for swinging the same toward and away from each other between a gripping position adapted frictionally to grip side margins of a container and a release position spaced outwardly therefrom, said operating means including an operating head mounted for vertical shifting relative to and independently of said mounting member and operatively connected to said operating arm portions of said gripping members, whereby vertical shifting of the operating head relative to the mounting member produces swinging of said gripping arms simultaneously about their individual pivot axes, powered lifting means for raising and lowering said gripping members between a lowered position in which they are disposed at an elevation to grip side margins of a container when moved together and a raised position spaced thereabove, and drive means for shifting said frame and gripping members between a container pickup station and a region over said container support.

3. The apparatus of claim 2, wherein said operating means for the gripping members further comprises an extensible-contractible ram mounted on said mounting member for vertical shifting therewith and said ram is operatively connected to said operating head for producing vertical shifting of the head relative to the mounting member on extension and contraction of the ram.

4. Apparatus for receiving randomly oriented containers and arranging them in rows on a support with the containers having preselected orientation in the rows, the apparatus comprising
   an infeed conveyor for moving randomly oriented containers in succession to a turning region in the apparatus, said infeed conveyor including a conveyor support having an upper surface on which the bottom of a container may rest,
   powered turning means at said turning region operable to engage a container and rotate the same toward a desired orientation, said turning means including a turning element mounted adjacent said conveyor support for rotation about an upright axis and for vertical shifting between a lowered position below the elevation of said surface and a raised position above said elevation for engaging the bottom of a container and raising it from the conveyor support for turning, powered raising means operatively connected to the turning element for producing said vertical shifting, and powered rotator means operatively connected to said turning element for rotating the same about said upright axis when the same is in its raised position,
   control means operable to sense the position of a container rotated by said rotator means and to stop the same when the container has reached said desired orientation,
   a container support spaced from said turning region, and
   shifting means for moving a container from said turning region and depositing it on the container support, all the while maintaining the orientation of the container as established by said turning and control means, said shifting means including a horizontally shiftable frame, at least a pair of horizontally spaced gripping members mounted for movement toward and away from each other, mounting means including a mounting member support on said frame for vertical shifting relative thereto mounting said gripping members on said frame for movement horizontally therewith and for movement vertically relative to the frame, each gripping member including an elongate arm supported dependently on and pivotally connected to said mounting member in a region spaced laterally outwardly from a central region of said mounting member and having an operating arm portion extending toward said central region, powered operating means connected to said gripping members for swinging the same toward and away from each other between a gripping position adapted frictionally to grip side margins of a container and a release position spaced outwardly therefrom, said operating means for the gripping members including an operating head mounted for vertical shifting relative to said mounting member and operatively connected to said operating arm portions of said gripping members for producing swinging of said gripping members on vertical shifting of said head relative to the mounting member, and power-operated means for producing vertical shifting of said head relative to said mounting member, powered lifting means for raising and lowering said gripping members between a lowered position in which they are disposed at an elevation to grip side margins of a container when moved together and a raised position spaced thereabove, and drive means for shifting said frame and gripping members between a container pickup station and a region over said container support.

5. The apparatus of claim 4, wherein said mounting means further comprises an upright column mounted for vertical movement on said frame, said support is mounted on said column for movement therewith, an elongate shaft extends vertically through a bore in said column, said operating head is connected to the lower end of said shaft, and the upper end of said shaft is operatively connected to a ram secured atop said column.

* * * * *